United States Patent [19]

Poad

[11] 4,223,631
[45] Sep. 23, 1980

[54] SAILING INDICATOR

[76] Inventor: Clarke M. Poad, 1499 Oak Ridge Rd., Neenah, Wis. 54956

[21] Appl. No.: 901,449

[22] Filed: May 1, 1978

[51] Int. Cl.³ .............................................. G01P 21/00
[52] U.S. Cl. .................................... 116/265; 114/103
[58] Field of Search ......................... 114/39, 102, 103; 73/180, 188, 189; 116/200, 265, 173, 174

[56] References Cited

U.S. PATENT DOCUMENTS

| 3,119,370 | 1/1964 | Keats | 116/173 |
| 3,395,577 | 8/1968 | Keim | 73/188 |
| 3,789,793 | 2/1974 | Keim | 116/200 |
| 3,799,106 | 3/1974 | Lamport | 116/200 |
| 3,815,412 | 6/1974 | Keim | 73/188 |

Primary Examiner—Trygve M. Blix
Assistant Examiner—D. W. Keen
Attorney, Agent, or Firm—Andrus, Sceales, Starke & Sawall

[57] ABSTRACT

The sailing indicator assembly is constructed to space the tail from the sail and to maximize the force effect of a light wind to keep a wet tail from sticking to the sail. More particularly, the inner end of the tail is mounted to a spacer member, the inner end of which is connected to a base. The base is in the form of a wedge having an upwardly slanted surface in a downwind direction, driving the wind outwardly and angularly against the inner portion of the tail. The base is preferably at least as wide as the tail. The spacer member is constructed to collapse if anything engages it, such as when the sail is folded or rolled for storage. More particularly, the spacer member is elongated to provide the spacing function and is flexible to permit collapse thereof.

8 Claims, 5 Drawing Figures

SAILING INDICATOR

PRIOR ART OF INTEREST

U.S. Pat. No. 3,119,3700 to Keats, filed 1/28/64; U.S. Pat. No. 3,395,577 to Keim, filed 8/6/68; U.S. Pat. No. 3,789,793 to Keim, filed 2/5/74; U.S. Pat. No. 3,799,106 to Lamport, filed 3/26/74; U.S. Pat. No. 3,815,412 to Keim, filed 6/11/74.

BACKGROUND AND SUMMARY OF THE INVENTION

This invention relates to a sailing indicator and more particularly to a device utilizing a tail and adapted to be secured to a sailboat sail for visually indicating wind direction and whether the sail has been properly trimmed.

Such sailing indicators are, in their broadest sense, already known. See especially the aforementioned U.S. Pat. Nos. 3,789,793 and 3,799,106. The indicators of these patents are subject to the disadvantage that the tail portions are disposed closely to the sail. In a light breeze such as 1-5 miles per hour, and if the tail is wet, the tail may tend to stick to the sail instead of performing its intended function.

It may be possible to mount the base or inner end of the tail so that it is spaced outwardly from the sail a substantial distance to reduce the problem of a wet tail sticking to the sail. However, an indicator constructed in this manner may cause problems when the sail is rolled up or folded for storage, because of the indicator's bulk. In such case, the indicators should preferably be removed from the sail.

In accordance with one aspect of the invention, the sailing indicator assembly is constructed to space the tail from the sail and to maximize the force effect of a light wind to keep a wet tail from sticking to the sail. More particularly, the inner end of the tail is mounted to a spacer member, the inner end of which is connected to a base. The base is in the form of a wedge having an upwardly slanted surface in a downwind direction, said surface driving the wind outwardly and angularly against the inner portion of the tail. The base is preferably at least as wide as the tail.

In accordance with another aspect of the invention, the spacer member is constructed to collapse if anything engages it, such as when the sail is folded or rolled for storage. More particularly, the spacer member is elongated to provide the spacing function and is flexible to permit collapse thereof.

BRIEF DESCRIPTION OF THE DRAWINGS

The accompanying drawings illustrate the best mode presently contemplated by the inventor for carrying out the invention.

In the drawings.

DESCRIPTION OF THE PREFERRED EMBODIMENT

Figure 1:
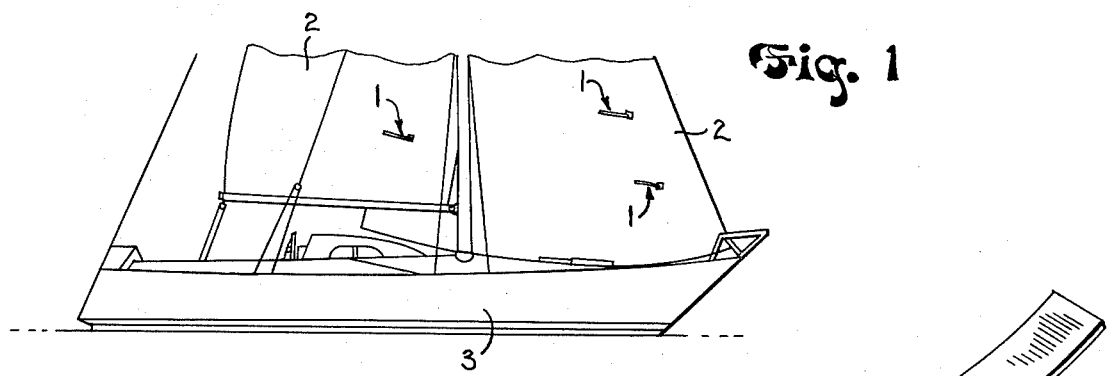
FIG. 1 is a partial side elevation of a sailboat having several sailing indicators of the invention mounted thereon.

As shown in FIG. 1 of the drawings, the sailing indicator 1 of the invention is adapted to be mounted to the sails 2 of a sailboat 3 of any desired type.

Figure 2:
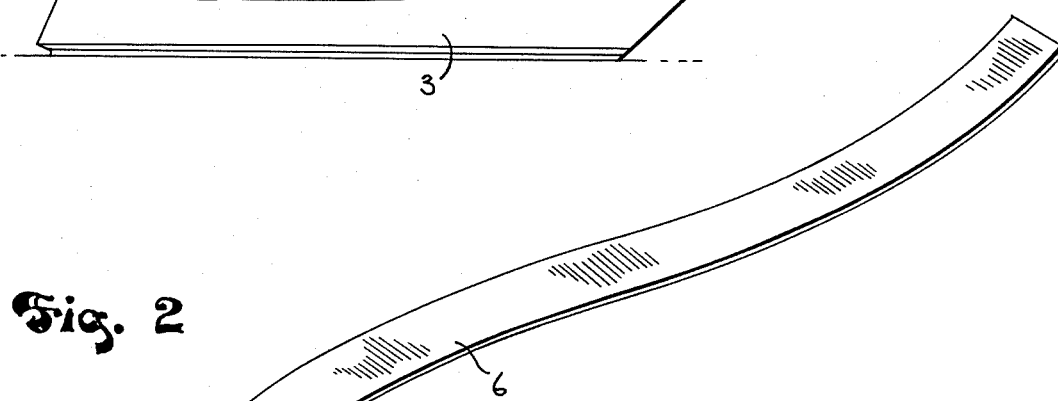
FIG. 2 is an enlarged perspective view of the sailing indicator.
Figure 3:
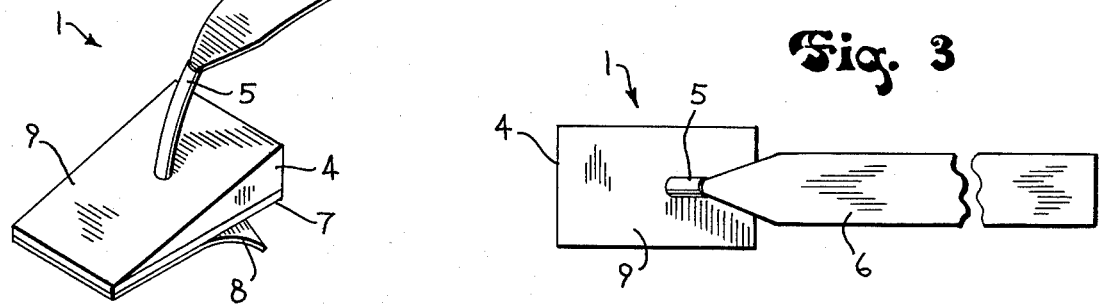
FIG. 3 is a top plan view of the indicator with the tail shortened.

Referring to FIGS. 2 and 3, indicator 1 comprises a base 4, a spacer member 5 extending from the approximate midporton of the base and a wind indicating tail 6 connected at its inner end to the outer end of spacer 5.

Tail 6 is preferably made of light-weight cloth-like material, such as nylon, and comprises an elongated flat strip of suitable length, such as 5"-6". The inner end portion of tail 6 is adapted to be secured to the outer end of spacer member 5. For this purpose, and in the present embodiment, member 5 is tubular and the inner tail end is stuffed into the tube and fastened thereinto in any suitable manner, such as by an adhesive. The inner end of spacer member 5 may be integral with base 4, or may be separate and, as shown, secured within an opening in the base and glued thereto. In either event, member 5 functions to space the inner end portion of tail 6 a substantial distance away from the boat sail 2.

Base 4 may be made of any suitable material and is provided with a flat lower face with a waterproof adhesive layer 7 and a removable peel strip 8 so that the base can easily be attached to a sail.

Figure 4:
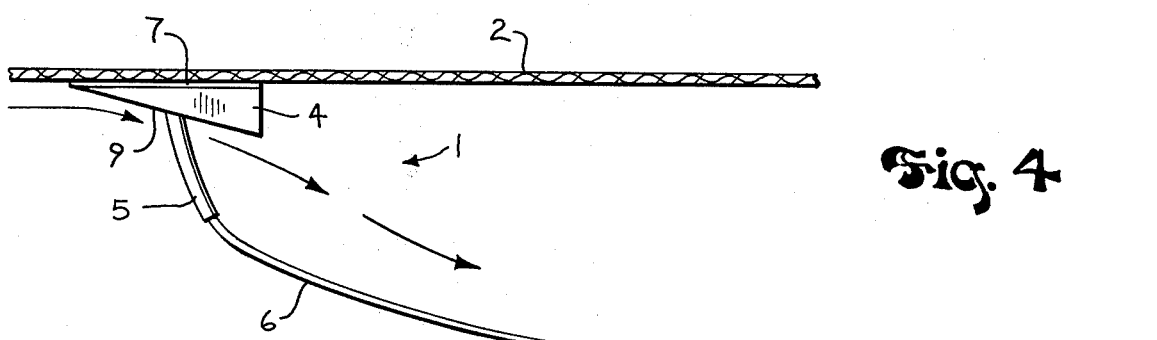
FIG. 4 is a side elevation of the indicator mounted on a sail and showing the effect of the angled base on the wind.

When indicator 1 is in use, it is desired to prevent a wet tail 6 from sticking to sail 2 during periods of light wind. Spacer 5 serves this purpose in part, because the wind is permitted to get between the tail and sail to pull the former away from the latter. In addition, and in accordance with one aspect of the invention, it is desired to maximize the separating effect of the wind. For this purpose, base 4 is shaped like a tapered wedge with its upper face 9 angled outwardly from the base in a downwind direction. As shown in FIG. 4, as the wind (shown by the arrows) approaches indicator 1 during sailing, it is forced outwardly away from sail 2 and toward tail 6 as it passes upwardly over the ramp-like upper face of base 4. This uplift of air applies additional pressure on the underside of tail 6 to keep it spaced from sail 2 and flying. Also, and referring to FIG. 3, the face 9 of base 4 is preferably at least as wide as or wider than the width of tail 6 so that the uplifting wind will engage the full width of the tail's underside.

The angle of inclination of face 9 relative to the bottom of base 4 and to sail 2 should be somewhere in the range of 10°-20°, and preferably at about 15°.

Figure 5:
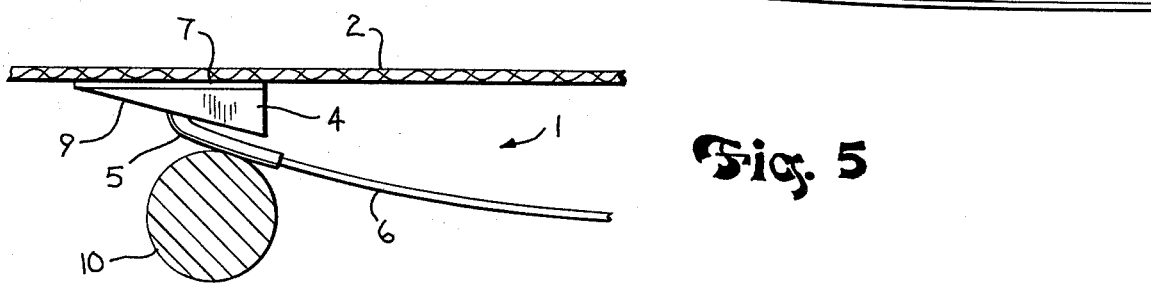
FIG. 5 is a view showing the collapsability of the spacer member.

It is to be noted that spacer member 5 is of substantial length, such as ¾"-1". Such an elongated member sticking out from the face of the sail could be damaged if it was struck by an object. Or, the member could interfere with or damage the sail when the latter is folded or rolled for storage. In accordance with another aspect of the invention, this problem is solved. In the present embodiment, spacer member 5 is made of flexible material such as soft plastic so that it will collapse sidewardly toward face 9 when it is engaged by a foreign object 10 (FIG. 5), or by the sail itself during storage. In the latter instance, indicator 1 therefore does not have to be removed to protect the sail.

The invention provides a simple and inexpensive sailing indicator which is substantially improved over prior devices.

Various modes of carrying out the invention are contemplated as being within the scope of the following claims particularly pointing out and distinctly claiming the subject matter which is regarded as the invention.

I claim:

1. A sailing indicator for attachment to the sail of a boat, said indicator comprising:
   (a) a base for securement to a sail,
   (b) a spacing member extending outwardly from said base,
   (c) and an elongated tail connected at its inner end portion with the outer end portion of said spacing member,
   (d) said base forming means to lift the moving air away from the said sail and direct the air toward said tail during sailing,
   (e) said air lifting means comprising an upper face on said base, said face being angled outwardly from said base in a downwind direction.

2. A sailing indicator for attachment to the sail of a boat, said indicator comprising:
   (a) a wedge-shaped base for securement to a sail and with said base having an upper face angled outwardly from the base in a downwind direction at an angle of inclination of 10°–20°,
   (b) a tubular spacing member extending outwardly from said base and with said member being collapsible toward the said face of said base,
   (c) and an elongated tail, the inner end of which is secured within the outer end portion of said tubular spacing member,
   (d) said base being at least as wide as the width of said tail.

3. The sailing indicator of claim 1 wherein said base is wedge-shaped.

4. The sailing indicator of claims 1 or 3 wherein the angle of inclination of said face relative to the sail is between 10° and 20°.

5. The sailing indicator of claims 1 or 3 wherein the angle of inclination of said face relative to the sail is about 15°.

6. The sailing indicator of claims 1 or 3 wherein said face is at least as wide as the width of said tail.

7. The sailing indicator of claims 1 or 3 wherein said spacing member is collapsible toward the said face of said base upon engagement of said member by an object.

8. The sailing indicator of claims 1 or 3 wherein said spacing member is tubular and said tail is secured within said member.

* * * * *

UNITED STATES PATENT AND TRADEMARK OFFICE
CERTIFICATE OF CORRECTION

PATENT NO. : 4,223,631
DATED : September 23, 1980
INVENTOR(S) : CLARKE M. POAD

It is certified that error appears in the above-identified patent and that said Letters Patent are hereby corrected as shown below:

Column 1, Line 5, Delete "3,119,3700" and substitute therefor ----3,119,370----; Column 1, Lines 5-9, Delete "filed" in every instance, and substitute therefor ----issued----.

Signed and Sealed this

Sixteenth Day of December 1980

[SEAL]

Attest:

SIDNEY A. DIAMOND

Attesting Officer

Commissioner of Patents and Trademarks